Sept. 6, 1955        G. F. MEYERS        2,716,844
LAWN MOWER SHARPENING MACHINE
Filed April 29, 1953        2 Sheets-Sheet 1
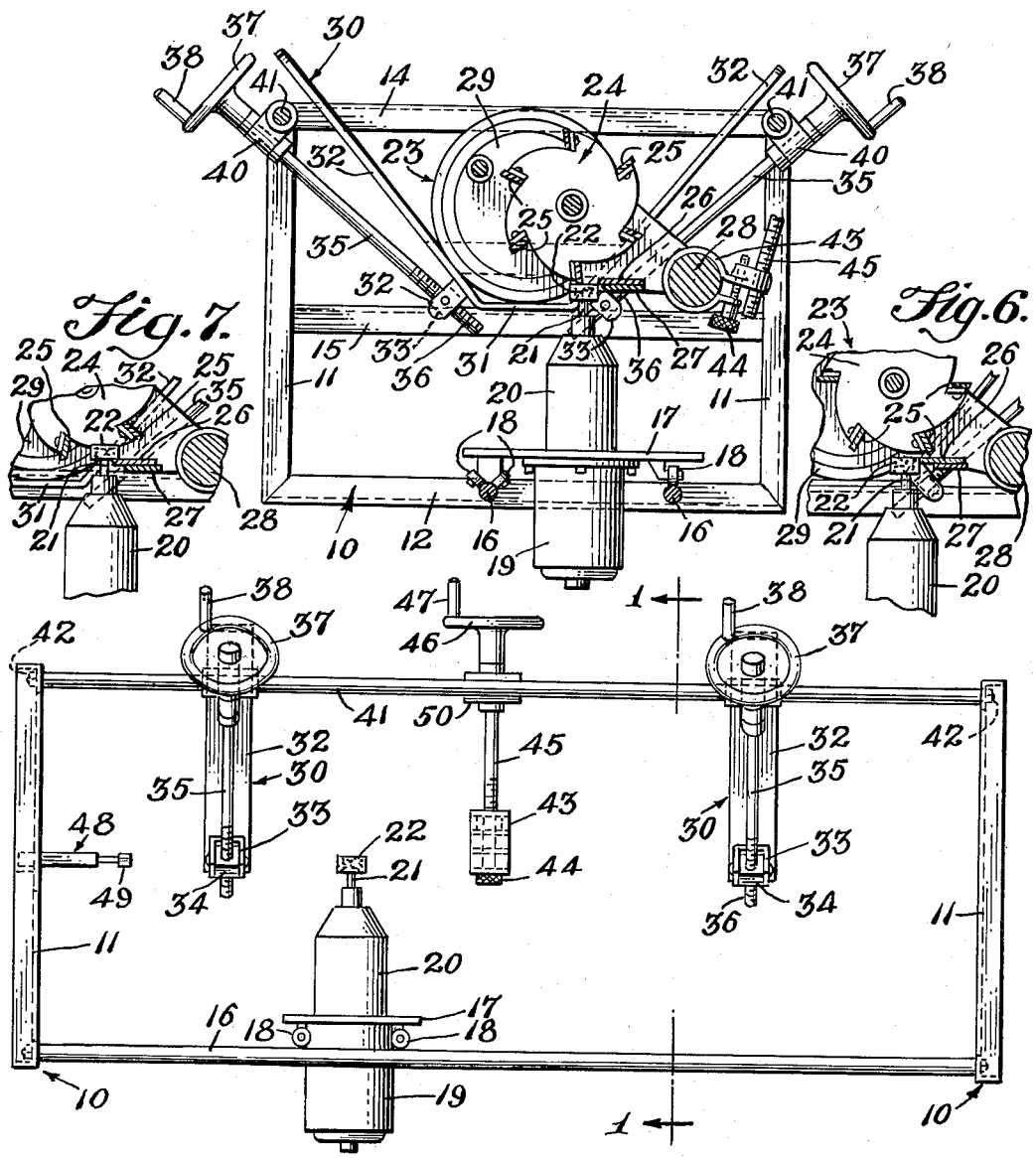
INVENTOR.
George F. Meyers,
BY Victor J. Evans & Co.
ATTORNEYS Sept. 6, 1955 G. F. MEYERS 2,716,844
LAWN MOWER SHARPENING MACHINE
Filed April 29, 1953 2 Sheets-Sheet 2
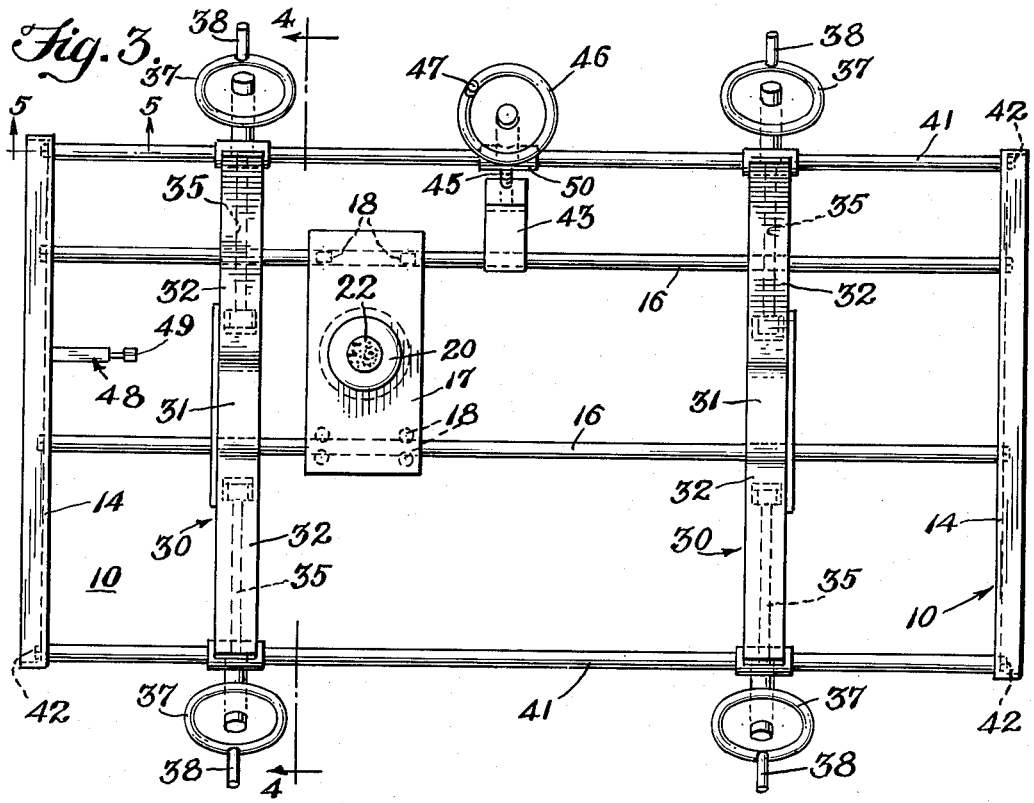
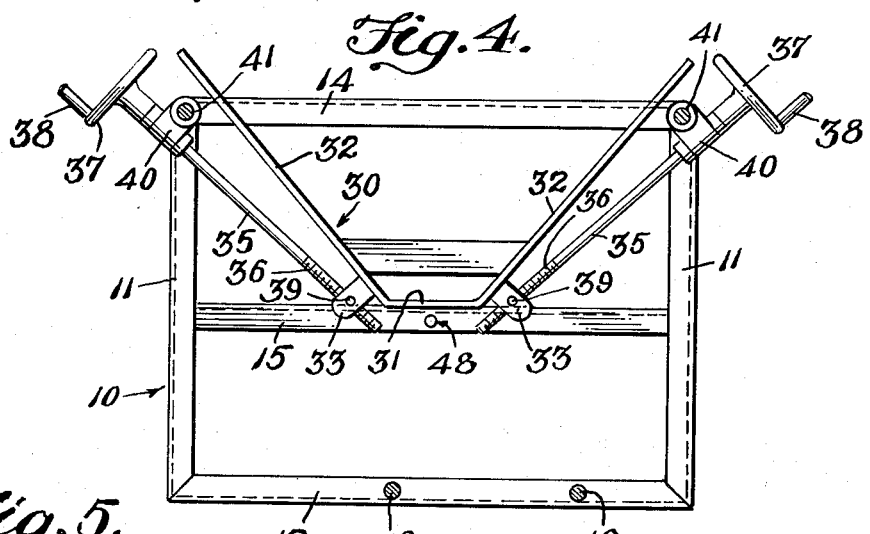
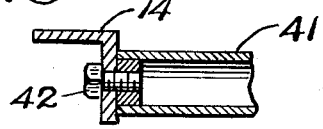
INVENTOR.
George F. Meyers,
by Victor J. Evans & Co.
ATTORNEYS 2,716,844

LAWN MOWER SHARPENING MACHINE

George F. Meyers, Mason City, Iowa

Application April 29, 1953, Serial No. 351,807

4 Claims. (Cl. 51—34)

This invention relates to a sharpening machine, and more particularly to a machine for sharpening lawn mowers.

The object of the invention is to provide an apparatus which will facilitate the sharpening of hand lawn mowers or power driven lawn mowers.

Another object of the invention is to provide a sharpening machine which is adjustable to accommodate lawn mowers of various sizes, the lawn mower support being adjustable so that the lawn mower can be properly located with respect to a movable grinding wheel.

Another object of the invention is to provide a lawn mower sharpening machine which will result in a saving of labor and will enable the lawn mower to be ground with precision and wherein lawn mowers can be ground or sharpened in less time and with less effort.

A further object of the invention is to provide a lawn mower sharpening machine which is extremely simple and inexpensive to manufacture.

Other objects and advantages will be apparent during the course of the following descripton.

In the accompanying drawings, forming a part of this application, and in which like numerals are used to designate like parts throughout the same:

Figure 1 is a sectional view taken on the line 1—1 of Figure 2.

Figure 2 is a side elevational view of the lawn mower sharpening machine of the present invention.

Figure 3 is a top plan view of the present invention.

Figure 4 is a sectional view taken on the line 4—4 of Figure 3.

Figure 5 is a sectional view taken on the line 5—5 of Figure 3.

Figure 6 is a fragmentary sectional view showing the stationary blade of the lawn mower being sharpened by the side of the grinding wheel.

Figure 7 is a view similar to Figure 6, but showing the undersurface of the grinding wheel being used for sharpening the lawn mower cutter blade.

Referring in detail to the drawings, the numeral 10 designates each of a pair of frame members, and the frame members 10 are arranged in spaced parallel relation with respect to each other. The frame members 10 may be fabricated of any suitable material such as angle iron, and each of the frame members 10 includes a pair of spaced parallel vertically disposed end pieces 11. The frame members 10 further each include a bottom piece 12 and a top piece 14, and the top and bottom pieces may be secured to the end pieces 11 in any suitable manner, as for example by welding. A brace 15 extends between each pair of the side pieces 11 and is secured thereto. Extending between the bottom pieces 12 of the frame members 10 and secured thereto is a pair of spaced parallel horizontally disposed rods 16 which may be circular in cross section, Figure 4. Movably mounted on the pair of rods 16 is a plate or platform 17 which carries bearing bearings 18 that engage the rods 16 so that the plate 17 can be manually shifted back and forth between the frame members 10 with ease so that all parts of the lawn mower blades can be ground or sharpened. Supported by the plate 17 is an electric motor 19 which may be connected to a suitable source of electrical energy, and extending upwardly from the plate 17 is a support 20 for a shaft 21 that is driven by the motor 19. A suitable grinding or sharpening wheel 22 is mounted on the upper end of the shaft 21 so that as the motor 19 is actuated the grinding wheel 22 will be rotated.

The numeral 23 designates a lawn mower which is to be sharpened, Figure 1, and the lawn mower 23 includes the usual rotatable reel 24 which carries a plurality of cutting blades 25. The lawn mower 23 further includes a stationary cutting blade 26 that may be arranged contiguous to a support member 27, and the numeral 28 designates the usual ground-engaging roller of the lawn mower. The numeral 29 designates each of the pair of ground-engaging wheels of the lawn mower.

A means is provided for supporting the lawn mower to be sharpened, and this means comprises a pair of brackets 30 which are adjustable and which each has a substantial V-shape. Each of the brackets 30 includes a lower web or crosspiece 31 and a pair of converging arms 32. Secured to the outer surface of each of the arms 32, adjacent the lower end thereof, is a clamp 33, and pins 39 connect a block 34 to each of the clamps 33. Each of the blocks 34 is provided with a threaded opening or bore, and a shaft 35 having a threaded portion 36 is arranged in threaded engagement with the threaded openings in each of the blocks 34. A hand wheel 37 is mounted on the upper end of each of the shafts 35 for rotating the shafts, and a hand grip 38 is secured to each of the wheels 37 for facilitating the turning thereof. Thus, by rotating the shafts 35, the brackets 30 which support the wheels 29 of the lawn mower 23 that is being sharpened, can be raised or lowered or tilted so as to enable the grinding wheel 22 to engage all parts of the blades 25 and 26. A bushing 40 slidably connects each of the shafts 35 to the bars 41 which extend between the upper portions of the frame members 10. Suitable securing elements such as bolts 42 may be provided for securing the ends of the bars 41 to the frame members 10, Figure 5. Since the bushings 40 slidably engage the bars 41, the brackets 30 can be shifted towards and away from each other to accommodate lawn mowers of various sizes.

There is further provided a clamp 43 which is adapted to engage the ground-engaging roller 28 of the lawn mower 23. A locking bolt 44 is carried by the clamp 43, and a shaft 45 has a threaded portion engaging the clamp 43. For rotating the shaft 45, a wheel 46 is connected to the upper end thereof, and a hand grip 47 is secured to the wheel 46. A bushing 50 slidably connects the shaft 45 to one of the rods 41.

Extending from one of the frame members 10 is a tool 48 for use in dressing or sharpening the grinding wheel 22 in the event that the grinding wheel 22 becomes dulled. The tool 48 may include a diamond tip 49 for sharpening the grinding wheel 22, and the grinding wheel 22 can be moved to a position contiguous to the tool 48 when it is to be sharpened.

From the foregoing, it is apparent that an apparatus has been provided for facilitating the sharpening of lawn mower blades. The frame members 10 have adjustably mounted therebetween the brackets 30 which can be adjusted by means of the wheels 37 so that the lawn mower blades can be moved into position to be sharpened by the grinding wheel 22. In Figure 1 the grinding wheel 22 is shown in position for grinding the reel blades 25, while in Figure 6, the grinding wheel 22 is shown in position for grinding the leading edge of the cutter bar 26. In Figure 7 the parts are shown in position such that the top face of the cutter bar 26 is being ground by the undersurface of the grinding wheel 22. With the present invention it is not necessary to remove the lawn mower wheels to grind the blades and the operation of grinding or sharpening the lawn mower blades can be accomplished and with ease. Also, the apparatus of the present invention will accommodate any wheel size of mower and the bearings 18 provide a smoother more efficient hand operated action. The present invention can also be used for sharpening the blades of power driven lawn mowers. By using the present invention there will be a saving in labor and the blades can be precision ground and the brackets 30 can be adjusted to accommodate various sizes of mower wheel carriages. When sharpening power mowers it is only necessary to remove the drive chain and mower reels and the cutting bar are ground at proper angles and clearance by means of the grinding wheel 22 to provide a free running reel with a scissors action cut. The frame members 10 may be made of angle iron and the center shaft 45 carries the clamp 43 which clamps to the rollers 28 of the mower. The diamond cutter 48 can be used for redressing or truing the top, side and underside of the grinding wheel 22. The wheel carriages or brackets 30 can be adjusted by rotating the wheels 37 and the brackets 30 can also be slid back and forth between the frame members 10 to accommodate different sized mowers. The parts can be adjusted so that the leading edge of the mower cutter bar 26 will be ground as shown in Figure 6 and also the parts can be adjusted to grind the top part of the cutter 26 by the undersurface of the grinding wheel 22, as shown in Figure 7. Thus, the sharpening of the reel blades 25 and the two cuts on the cutting bar 26 can be accomplished without removing anything but the drive chain to permit free rotation of the mower reel 24. The dressing tool 48 may be adjustably connected to the frame member 10.

To grind the mower reel 24, the drive chain of a power lawn mower is removed and the roll 28 is engaged by the clamp 43. Then, the shafts 35 are adjusted until the mower reel blades 25 touch the grinding wheel 22. Then, the grinding unit is slid from end to end of the reel blades 25 and the mower can be lowered while grinding by turning the shaft 43. Also, the leading edge of the cutter bar 26 can be ground by lowering the brackets 30 until the edge of the bar 26 is in the center of the side of the grinding wheel 22 and then the grinding unit can be moved from end to end of the cutter bar. To grind the top plate or surface of the cutter bar 26, the brackets 30 can be lowered so that the bar 26 will engage the undersurface of the grinding wheel 22, as shown in Figure 7 and then the grinding wheel can be moved from end to end of the bar. Also, by tilting the mower by means of the adjustable clamp 43, the proper angle can be put on the cutter bar. The machine can be supported by any suitable means such as carpenters' horses, or else two tables can be used for supporting the machine whereby there will be no interference with the motor 19 as it is reciprocated. The reel is turned by hand to keep the blade in engagement with the grinding element.

I claim:

1. A lawn mower sharpener comprising a pair of spaced parallel rectangular frame members each including end pieces and a top and bottom piece, a pair of spaced parallel horizontally disposed cylindrical rods extending between the bottom pieces of said frame members and secured thereto, a pair of spaced parallel horizontally disposed bars extending between the tops of said frame members and secured thereto, a pair of adjustable brackets positioned between said frame members for supporting the wheels of a lawn mower to be sharpened, each of said brackets including a horizontal crosspiece and a pair of arms extending upwardly and outwardly from said crosspiece, a clamp secured to the outer surface of each of said arms adjacent the lower end thereof, a block mounted in each of said clamps and provided with a threaded bore, a shaft having a threaded portion engaging each of said bores, a handle for rotating said shafts, a bushing slidably connecting each of said shafts to said bars, a horizontally disposed movable plate mounted below said brackets and movable along the longitudinal axis of the lawn mower, a plurality of rollers connected to said plate for engaging said rods, an electrically driven grinding wheel mounted on said plate, a motor carried by said plate for actuating said grinding wheel, a shaft connected to one of said bars, and a clamp connected to said last named shaft for engaging the ground-engaging roller of the lawn mower.

2. The apparatus as described in claim 1, and further including a tool mounted on one of said frame members for dressing the grinding wheel.

3. In a lawn mower sharpener, a pair of spaced parallel rectangular frame members each including end pieces and a top and bottom piece, a brace extending between each pair of end pieces and secured thereto, a pair of spaced parallel horizontally disposed cylindrical rods extending between the bottom pieces of said frame members and secured thereto, a pair of spaced parallel horizontally disposed bars extending between the tops of said frame members and secured thereto, a pair of adjustable brackets each having a substantially V-shape positioned between said frame members for supporting the wheels of a lawn mower to be sharpened, each of said brackets including a web and a pair of converging arms extending from said web, a clamp secured to the outer surface of each of said arms adjacent the lower end thereof, a block mounted in each of said clamps and provided with a threaded bore, a shaft having a threaded portion engaging each of said bores, a handle for rotating said shafts, a bushing slidably connecting each of said shafts to said bars, a horizontally disposed movable plate mounted below said brackets, a plurality of rollers connected to said plate for engaging said rods, said rollers on one side of said plate being arranged in angular relation with respect to each other to maintain said plate on said rods, said rollers permitting longitudinal movement of said plate along said rods, a support member extending upwardly from said plate and secured thereto, a shaft extending through said support member, a grinding wheel mounted on said shaft, an electric motor secured beneath said plate for operating said shaft, said motor adapted to be connected to a source of electrical energy, a clamp for engaging the ground engaging roller of the lawn mower, a locking bolt carried by said last named clamp, a shaft having a threaded portion engaging said clamp, a bushing slidably connecting said last named shaft to one of said bars, and a handle on the upper end of said last named shaft.

4. A lawn mower sharpener comprising a pair of frame members each including end pieces and a top and bottom piece, a pair of rods extending between the bottom pieces of said frame members and secured thereto, a pair of bars extending between the tops of said frame members and secured thereto, a pair of adjusting brackets positioned between said frame members for supporting the wheels of a lawn mower to be sharpened, each of said brackets including a crosspiece and a pair of arms extending upwardly and outwardly from said crosspiece, a clamp secured to each of said arms, a block mounted in each of said clamps and provided with a bore, a shaft having a portion engaging each of said bores, a handle for rotating said shafts, a bushing slidably connecting each of said shafts to said bars, a movable plate mounted below said brackets and movable along the longitudinal axis of the lawn mower, a plurality of rollers connected to said plate for engaging said rods, an electrically driven grinding wheel mounted on said plate, a motor carried by said plate for actuating said grinding wheel, a shaft connected to one of said bars, and a clamp connected to said last named shaft for engaging the ground engaging roller of the lawn mower.

(References on following page)

References Cited in the file of this patent

UNITED STATES PATENTS

| | | | |
|---|---|---|---|
| 800,975 | Brasch | Oct. 3, | 1905 |
| 946,635 | Franke | Jan. 18, | 1910 |
| 1,605,890 | Brown | Nov. 2, | 1926 |
| 2,180,911 | Rogers | Nov. 21, | 1939 |
| 2,406,162 | Pedersen | Aug. 20, | 1946 |
| 2,432,851 | Anderson | Dec. 16, | 1947 |
| 2,493,619 | Comstock | Jan. 3, | 1950 |
| 2,530,479 | Pater et al. | Nov. 21, | 1950 |